United States Patent [19]
Herzberger et al.

[11] 3,760,144
[45] Sept. 18, 1973

[54] OPTIMUM FOCUSING IN AN ELECTRON BEAM WELDING MACHINE

[75] Inventors: Peter Herzberger, Canonica Di Cuveglio; Learco Di Piazza, Angera, both of Italy

[73] Assignee: European Atomic Energy Community, Luxemburg, Luxembourg

[22] Filed: May 28, 1971

[21] Appl. No.: 148,113

[30] Foreign Application Priority Data
June 2, 1970  Luxembourg .......................... 61.048

[52] U.S. Cl. .......................................... 219/121 EB
[51] Int. Cl. .............................................. B23k 15/00
[58] Field of Search ............... 219/121 EB, 121 EM, 219/121 R, 131, 135; 250/49.5

[56] References Cited
UNITED STATES PATENTS

| | | |
|---|---|---|
| 2,089,015 | 8/1937 | Bucknam et al. ................. 219/135 X |
| 3,299,250 | 1/1967 | Vilkas et al. ......................... 219/131 |
| 3,033,974 | 5/1962 | Schleich et al. ..................... 219/117 |
| 2,746,420 | 5/1956 | Steigerwald............................. 118/8 |
| 3,049,618 | 8/1962 | Thome............................... 250/49.5 |
| 3,601,577 | 8/1971 | Meyer et al................... 219/121 EB |

*Primary Examiner*—J. V. Truhe
*Assistant Examiner*—Gale R. Peterson
*Attorney*—Stevens, Davis, Miller and Mosher

[57] ABSTRACT

Apparatus for determining optimum focusing of an electron beam at the site of a weld wherein the electron beam is directed onto a sample and the intensity of the infra-red radiation emitted at the point of incidence between the beam and the sample is measured by means of a photoelectric cell. A radiation chopper is placed between the photoelectric cell and the samples in such a manner that particles displaced from the workpiece are deflected away from the photoelectric cell. The focus is adjusted in dependence upon the intensity of the infra-red radiation.

2 Claims, 8 Drawing Figures

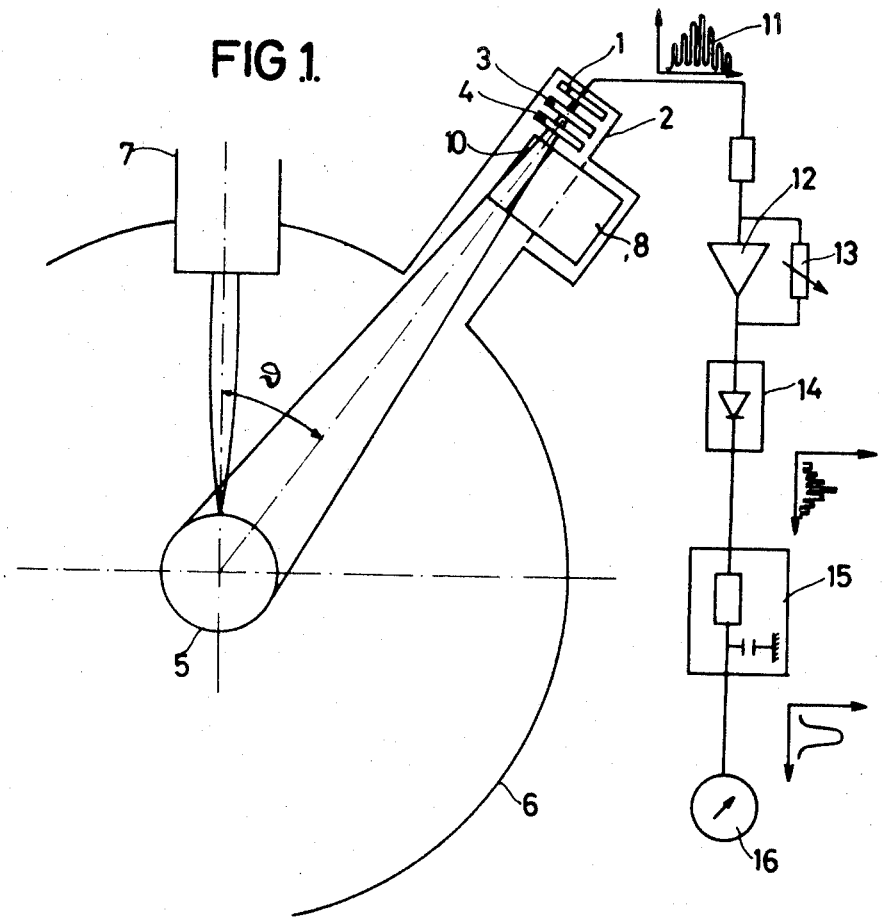

OPTIMUM FOCUSING IN AN ELECTRON BEAM WELDING MACHINE

BACKGROUND OF THE INVENTION

This invention relates to electron beam welding and particularly to a method of determining optimum focusing of an electron beam.

Various prior art methods for determining the focusing of an electron beam on a welding point are based on determining the position of the beam constriction section externally of the target surface and on subsequent accurate positioning thereof with respect to the target surface.

The best known and oldest method comprises forming a molten line on a sample of the same composition as the workpiece to be welded, with the selected voltage, current, speed and welding distance. The vapour emitted by the molten metal is ionized in the beam, emitting visible radiation, which enables the beam to be observed. The current passing through the electromagnetic focusing coils is controlled to bring the beam constriction section on to the target surface.

It is well known that the beam constriction section of the beam focused on to the target surface does not correspond to the section obtained when the same beam is analysed externally of the target surface, i.e., when the electrons move without encountering a target that they can melt. Thus it can be seen that this method is empirical and inaccurate.

Another prior art method comprises recording the variations in the current absorbed in a Faraday cage when the beam is occulted normally to its axis by a disc or by the edge of a bevelled member and when an oscillating beam passes above a diaphragm of a diameter smaller than that of the electron beam.

Another prior art method comprises measuring the variation of the current flowing in a tungsten wire which is moved at constant velocity across the beam normally to the axis thereof. The constriction section is obtained when the time taken for the wire to mask or traverse the beam is at a minimum value.

Another method is based on the principle that a cross-section of the beam intercepted by a target is an X-ray source, an image of which can be obtained on a sensitive plate disposed in a camera; the image of the minimum diameter corresponds to the beam constriction section.

None of the above methods can be considered entirely satisfactory. Visual control is empirical and inaccurate; it cannot be used for metals which emit intense bands of light on ionization of their vapours or for any metal when the power of the beam exceeds a critical value characteristic of the particular metal.

The methods based on measuring electrical current are inconvenient in that they require complex, fragile and expensive equipment, and the disadvantages become prohibitive in the case for example, of an industrial machine in which the beam power exceeds about 5 kW. The method based on recording the image of the X-ray source has not only the above disadvantages but also those arising from the intermittent nature of recording, the inaccuracy of the dimensions of the image on the film, and the time required to develop the latter.

Apart from empirical visual adjustment, in all the systems described, the beam constriction section is located without being disturbed by the melting of the target. During welding, the metal ions modify the trajectory of the electrons and produce a squeezing of the beam near the surface of the molten metal. The constriction section is moved and its diameter is reduced.

These modifications are independent of the operator and their amplitude and reproducibility are not known, and consequently they introduce an additional risk of random error as regards reproductibility of the form and dimensions of a weld.

Another method comprises monitoring the electronic current flowing through the workpiece; by studying its variations as a function of the constriction current it is possible to determine characteristic points so that conclusions as to the beam focusing are possible. The disadvantage of this method is that the workpiece to be welded must be insulated from the remainder of the installation, and this is difficult in industrial apparatus when the workpiece has to be movable inside the vacuum enclosure.

Another prior art method is based on the investigation of the theoretical focusing. If all the parameters of the problem are known, i.e., electron acceleration voltage, workpiece to gun distance, beam intensity, etc., then application of electro-optical formulae will enable the value of the concentration current to be calculated either by a computer or by an operator. This latter method has the disadvantage of being purely theoretical, it is not direct and it is therefore impossible to allow for the inaccuracy of the parameters of the problem.

SUMMARY

According to the invention there is provided a method of focusing the beam of an electron welding machine, comprising the steps of directing the beam on to a workpiece, measuring the intensity of the infra-red radiation emitted by the central point of incidence of the beam on the workpiece, and adjusting the focus in dependence on said intensity.

To obtain optimum focus, the focus is adjusted to maximum intensity if there is only one maximum, and the focus is adjusted to the relative minimum between two maxima in cases in which there are two maxima.

Further according to this invention there is provided in an electron beam welding machine, a system for indicating the optimum focus of the beam on a workpiece comprising infra-red radiation detecting means arranged with its sensitivity axis directed towards the central point of incidence of the beam on the workpiece, and providing an output signal, amplifying means for receiving the output signal from the radiation detecting means and providing an amplified output signal, and indicating means for receiving the output signal from the amplifying means, and for providing an indication of the amplitude of the radiation received by the radiation detecting means.

DESCRIPTION OF THE DRAWINGS

A specific embodiment will now be described by way of example with reference to the accompanying drawings in which:

FIG. 1 is a part schematic section/part diagrammatic view of an electron beam apparatus;

FIG. 2 is a perspective view of a grooved cylinder for use in the apparatus of FIG. 1.

DETAILED DESCRIPTION

Figure 3A:
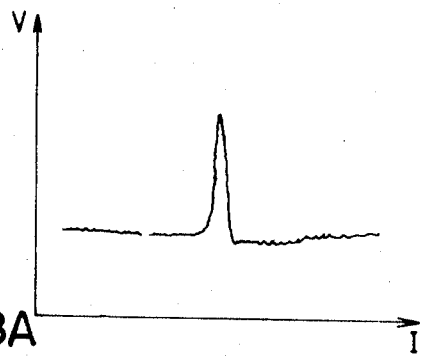
FIGS. 3A to 3F show the variation of photocell output as a function of electron beam focusing current, for different beam powers.
Figure 3B:
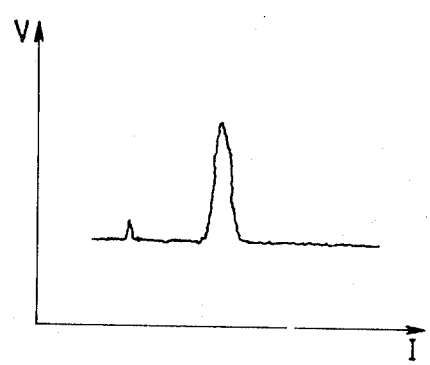
Figure 3C:
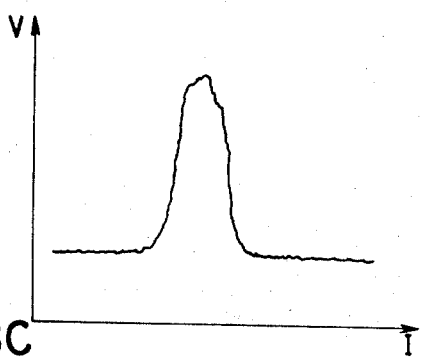

According to Kirchhoff's law the radiation energy flux emitted from the welding point is given by equation (1), $$101 = KST^4 \qquad (1)$$

in which $K$ is the absorption coefficient; $S$ is the area of the emission surface; and $T$ is the absolute temperature.

In FIG. 1 there is shown part of an electron beam welding machine wherein an electron gun 7 is sealed into the wall of a casing 6. A workpiece 5 is disposed along the center of casing 6.

When the machine is in operation, the casing is evacuated and an electron beam is focused onto the workpiece.

In order to set the focus of the electron beam welding machine before making a weld, the focus is first adjusted using a sample having the same dimensions and being made of the same material, alternatively a peripheral portion of the material to be welded could be used. The term workpiece is intended to cover both the sample used for the setting of the beam focus, and the actual material to be welded.

A tube 2, also sealed into the casing 6, has its axis passing through the welding zone of the workpiece. The tube axis makes an angle $\theta$ with the axis of the electron beam. A silicon photocell 1 is mounted at the outer end of the tube and receives radiation emitted from the welding zone of the workpiece. The silicon photocell has the peak of its sensitivity curve situated in the infra-red region.

Mounted in front of the photocell are an infra-red filter 3 and a protective glass 4. The angle $\theta$ is made small to avoid working the photocell at low levels of radiation.

To assist the operator, an observation window (not shown) is also sealed into the casing 6.

A radiation chopper is shown in FIG. 2 and comprises a rotatable cylinder 9 having a number of grooves 10 in the cylindrical surface, running parallel to the axis of the cylinder. For convenience, only one groove is shown in FIG. 2, although in practice any reasonable number may be used. The chopper driven by a motor (not shown) is mounted in front of the protective glass 4 such that as the chopper rotates, the axis of the grooves pass in turn through the tube axis. The cylinder is rotated at such a speed that metal particles emitted from the welding point of the workpiece are prevented from passing completely through the grooves. This speed of rotation is given by equation $$V/d \geq v/l$$

where $V$ is the linear speed at the circumference of the cylinder; $v$ is the speed of the metal particles; $l$ is the length of the cylinder; and $d$ is the width of the grooves.

Since it is preferred to have an A.C. amplifying system to avoid problems of D.C. drift, etc., it can be seen that the chopper performs two functions, (i) preventing any metallization of the photocell, and (ii) chopping the radiation so as to provide a pulsed output from the photocell.

The output pulses 11 from the photocell are fed to an amplifier 12 which has an adjustable feedback resistor 13 so that the gain can be altered to permit a range of photocell outputs. This range may be from approximately 0.4V peak signal to approximately 0.4V peak signal. The output from amplifier 12 is fed to a rectifier 14 then to an integrator 15 and finally to a meter 16.

FIGS. 3A to 3F represent oscillograms photographed directly from the screen of an oscilloscope (not shown) showing the variations in the output voltage of the photoelectric cell 1 as a function of the focusing current of the electron beam welding machine for different welding powers. For low powers of less than 1kW (FIGS. 3A and 3B) the infra-red radiation emission, i.e., the temperature of the surface of the weld, increases with the concentration of the beam and passes through a maximum at maximum concentration. All that is required, therefore, is to note the focusing current corresponding to this maximum to obtain a maximum power density.

Figure 3D:
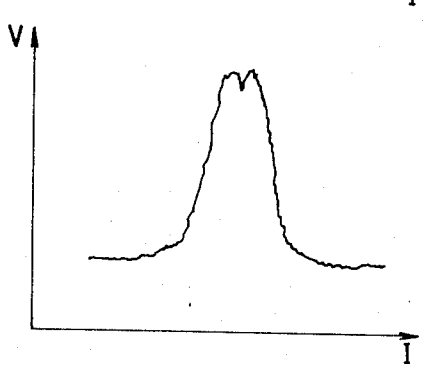
Figure 3E:
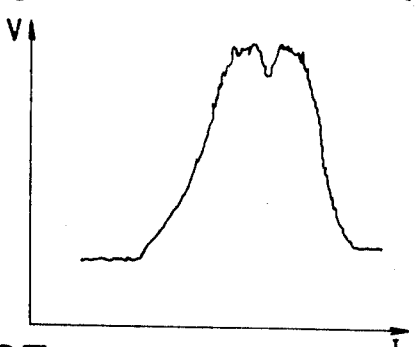
Figure 3F:
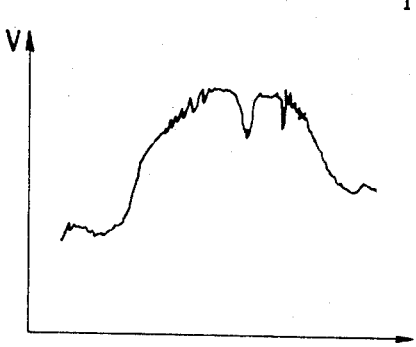

Above 1,700 W (FIG. 3C) there is a flattening of the top of the curve wih the formation of a hollow which is accentuated when the welding power increases (approximately 2,500 W), as shown in FIGS. 3D, 3E and 3F. Experience has shown that optimum focusing corresponds to the bottom of this hollow; a narrow and deep nail-shaped weld is then obtained. A weld corresponding to either of the two maxima is wider but shallower.

The explanation of this phenomenon may be as follows: when the concentration current varies linearly, the focal spot or impact area, decreases, passes through a minimum, and then increases. Initially, this spot is large and the power density is low, thus the temperature of the workpiece increases slightly.

As the concentration increases, the beam energy being combined to a smaller area, a crater filled with molten metal forms, and the surface temperature rises until a maximum value is reached.

When optimum focusing is obtained, i.e., when the power density reaches its maximum, the electron impact vaporizes the metal to form a crater which is covered with a film of molten metal. The beam then passes through this film without yielding much energy to it and impinges upon the base of the crater, where its energy is liberated in heat form. The penetration increases and the energy is concentrated farther and farther away from the surface. It can be shown that the surface of the metal then evolves less heat; there is also probably a modification of the absorption coefficient $K$ and the detected temperature falls. The focal spot then increases again and the temperature passes through another maximum and the above phenomenon and explanation apply to this second maximum.

The phenomenon, for the case when there are two maxima, normally has an axis of symmetry passing through the centre of the hollow, which is illustrated by FIGS. 3D, 3E and 3F.

Thus by observing the indication on meter 16 the optimum focus of the electron beam can be obtained; for low electron beam power the optimum focus is at the position of the maximum, whereas for high electron beam power the optimum focus is at the position of the minimum between the two maxima.

We claim:

1. Apparatus for welding a workpiece comprising
   a. an evacuated casing for receiving said workpiece;
   b. an electron gun mounted in the wall of said casing for directing an electron beam onto said workpiece, c. an infra-red radiation detector mounted within said evacuated casing adjacent said electron gun, said detecting means having a sensitivity axis directed to receive radiation from the region of said workpiece on which said electron beam is incident, d. a radiation chopper comprising a rotatable member having at least one groove extending along the surface thereof parallel to the axis of said member, said member being disposed between said infra-red radiation detector and said workpiece with its axis parallel to the sensitivity axis of said infra-red radiation detector, e. means for rotating said radiation chopper about the axis of said member to interrupt periodically the radiation falling on said detector, the speed of said rotation being such that metal particles emitted from the region of said workpiece on which said electron beam is incident are trapped in said groove as said member rotates, f. amplifying means coupled to said infra-red radiation detector, and g. indicating means coupled to the output of said amplifying means, said indicating means providing an indication of the amplitude of the infra-red radiation emitted from the region of said workpiece on which said electron beam is incident as a function of the current required for focussing said electron beam.

2. Apparatus as defined by claim 1 wherein said radiation chopper is a cylinder having a number of circumferentially spaced grooves extending along the cylindrical surface thereof parallel to the axis of said cylinder.

* * * * *

UNITED STATES PATENT OFFICE
CERTIFICATE OF CORRECTION

Patent No. 3,760,144           Dated September 18, 1973

Inventor(s) Peter Herzberger, et al

It is certified that error appears in the above-identified patent and that said Letters Patent are hereby corrected as shown below:

Col 3, line 6, change the formula to read

-- $\phi = KST^4$ --

Col. 4, line 3, change

"0.4V" (first occurrence) to --0.4MV--

Signed and sealed this 2nd day of April 1974.

(SEAL)
Attest:

EDWARD M. FLETCHER, JR.
Attesting Officer

C. MARSHALL DANN
Commissioner of Patents